United States Patent [19]

Sender

[11] 3,843,290

[45] Oct. 22, 1974

[54] EXTRUSION DIE
[75] Inventor: Wilfried E. Sender, Johnstown, Pa.
[73] Assignee: Sender Ornamental Iron Works, Johnstown, Pa.
[22] Filed: Dec. 18, 1972
[21] Appl. No.: 316,235

[52] U.S. Cl. ................ 425/208, 264/40, 425/144, 425/378, 73/343 R, 73/359
[51] Int. Cl. ............................................. B29b 1/04
[58] Field of Search ........... 425/378, 143, 144, 145, 425/208, 170, 376; 264/40; 73/343 R, 349, 359

[56] References Cited
UNITED STATES PATENTS
2,722,716  12/1955  Henning ............................ 425/144
3,021,561  2/1962   Reifenhauser ..................... 425/208
3,480,997  12/1969  List .................................... 425/144
3,499,189  3/1970   Perras ............................... 425/144

Primary Examiner—R. Spencer Annear
Assistant Examiner—Mark Rosenbaum
Attorney, Agent, or Firm—Charles L. Lovercheck

[57] ABSTRACT

An extrusion die made up of a barrel with a screw rotatable in it to direct plastic from it with means to rotate the screw. A thermocouple supported in a tube inside the screw, the thermocouple terminating at a position outboard of the screw end, so that the thermocouple senses the temperature of the plastic directly before it leaves the die.

5 Claims, 1 Drawing Figure

PATENTED OCT 22 1974  3,843,290
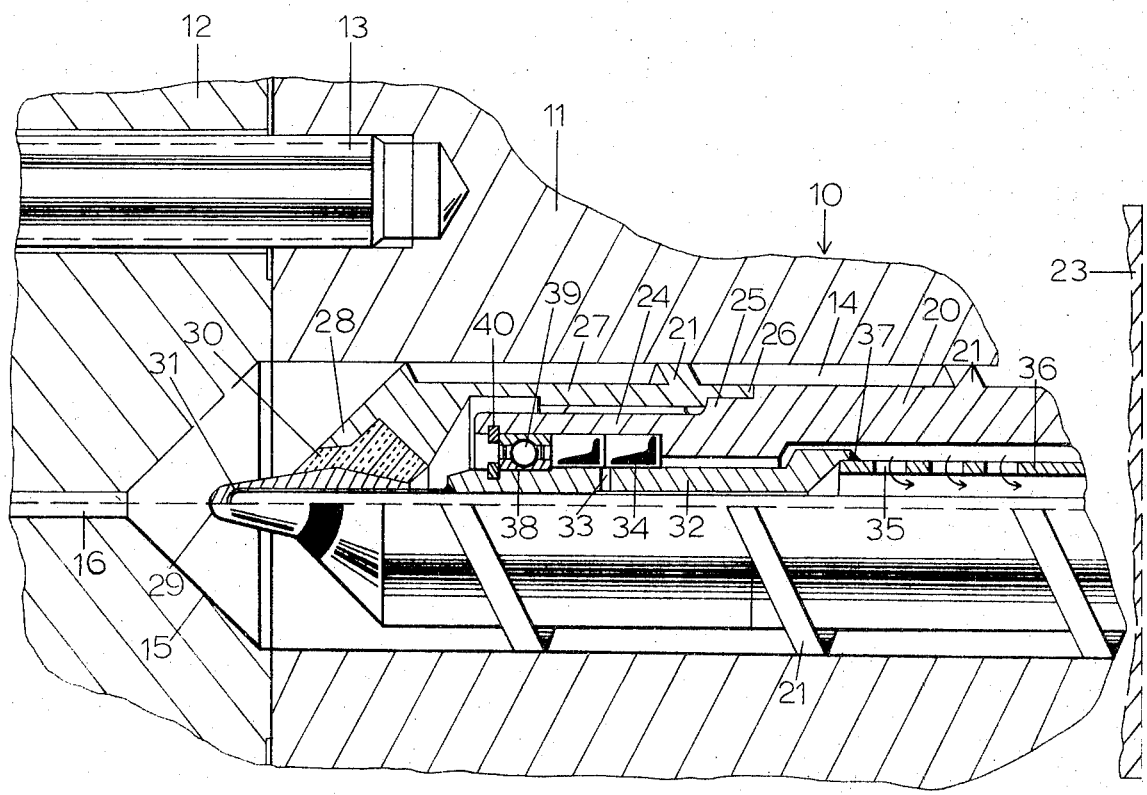

ދ,843,290

EXTRUSION DIE

REFERENCE TO PRIOR ART

Various efforts have been made to provide means to measure the temperature of plastic leaving extrusion dies. An example of such a die is shown in U.S. Pat. No. 2,722,716 to Henning. In that die, the thermocouple is freely received in the screw, and the thermocouple is not in contact with either the screw itself or plastic around the screw. In the invention disclosed herein, the thermocouple terminates in a tip, and the thermocouple wire is in close proximity or in actual contact with the tip. The thermocouple senses the temperature of the plastic itself. The thermocouple is supported in a tube, and the screw rotates around the tube on anti-friction bearings.

OBJECTS OF THE INVENTION

It is an object of the invention to provide an improved extrusion die.

Another object of the invention is to provide an extrusion die that is simple in construction, economical to manufacture, and simple and efficient to use.

Another object of the invention is to provide an extrusion die with a thermocouple supported in it wherein the screw of the die can freely rotate around the thermocouple.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

The drawing shows a partial longitudinal cross sectional view of the extrusion die according to the invention.

DETAILED DESCRIPTION OF THE DRAWING

The extrusion die 10 disclosed herein has a barrel 11, which may be cylindrical in shape in accordance with good mechanical practice familiar to those skilled in the art. The barrel 11 has a nozzle 12 supported on it by means of bolts 13. The bolts 13 hold the nozzle 12 in positive engagement with the end of the barrel.

The barrel has a cylindrical bore 14, which terminates in a frusto-conical end 15, and an opening 16 through it which communicates with the bore 14 and with the die into which the plastic is to be extruded.

The screw 20 is driven by a suitable drive mechanism indicated generally at 23. The screw is generally of a conventional type and has a spiral flute 21 which operates in close proximity to the inside surface of the bore 14.

The screw 20 has a reduced side end 24 and shoulder 25, which is received in the counterbore 26 of the head 27. The head 27 has a frusto-conical surface 28, which operates in spaced relation to the frusto-conical end surface 14.

The end of the screw receives the tip 29, which projects from the end of the screw and is held in place by high temperature thermal insulation 30. The thermocouple 31, which is of a type familiar to those skilled in the art, is received in the hollow of the tip.

The tube 36 extends through the drive 23 and has its end welded at 37 to the open end of the tube end 32. The tube end 32 has ventilation holes 33 in it between the special waterproofing material rings 34. The end of the tube adjacent to the tip of the screw has a shoulder surface which receives the bearing 38. The bearing 38 has anti-friction balls 39 held in place by seal washers 40 of a type familiar to those skilled in the art. Thus, the screw 20 can rotate freely around the thermocouple and around the tube 36 that holds it. The tube 36 ventilation holes 35 in it. They allow for the free flow of air around the thermocouple and into and out of the outer ends. The thermocouple wires 31 pass out through the drive 23 as aforesaid and are connected to a suitable instrument.

Since the anterior tip 29 is so near the opening 16 in the die nozzle 12, the plastic issuing from the bore 14 passes over the tip 29, and the temperature thereof is sensed by the thermocouple 31 in tip 29.

The foregoing specification sets forth the invention in its preferred practical forms but the structure shown is capable of modification within a range of equivalents without departing from the invention which is to be understood is broadly novel as is commensurate with the appended claims.

I claim:
1. An extrusion die comprising
    a die barrel having a generally cylindrical bore,
    said bore having a closed end,
    an opening in said closed end to discharge plastic from said bore,
    a hollow screw in said bore having a spiral flute adapted to rotate in close proximity with the wall defining said bore,
    a tube in said screw,
    drive means driving said screw for rotation in said barrel,
    and sensing means connected to the outer end of said tube,
    anti-friction bearings in said hollow screw supporting said tube concentric thereto, whereby said screw can rotate around said tube,
    and a temperature sensing wire extending through said tube and terminating adjacent said opening in said die, whereby the temperature of plastic adjacent said discharge opening can be sensed,
    and heat insulation material between said sensing means and said frusto-conical end.
2. The die recited in claim 1 wherein said screw terminates in a tip,
    said sensing means disposed in said tip fixed to said frusto-conical end,
    said tip extends outwardly beyond the end of said screw,
    and said heat insulation material supporting said tip in said screw.
3. The die recited in claim 1 wherein said screw has a frusto-conical end,
    and said tip projects a substantial distance beyond said frusto-conical end and terminates adjacent said discharge opening.
4. The die recited in claim 1 wherein said tube has ventilation openings.
5. The die recited in claim 2 wherein said tube terminates in a head adjacent said tip,
    two spaced waterproof rings are supported on said head forming a seal between said head and said screw,
    and openings are provided in said head between said waterproof rings.

* * * * *